US012106741B2

(12) United States Patent
Kafuku et al.

(10) Patent No.: US 12,106,741 B2
(45) Date of Patent: Oct. 1, 2024

(54) MUSICAL PERFORMANCE SYSTEM, TERMINAL DEVICE, METHOD AND ELECTRONIC MUSICAL INSTRUMENT

(71) Applicant: CASIO COMPUTER CO., LTD., Tokyo (JP)

(72) Inventors: Shigeru Kafuku, Akishima (JP); Takeshi Imai, Hamura (JP)

(73) Assignee: CASIO COMPUTER CO., LTD., Tokyo (JP)

(*) Notice: Subject to any disclaimer, the term of this patent is extended or adjusted under 35 U.S.C. 154(b) by 652 days.

(21) Appl. No.: 17/350,962

(22) Filed: Jun. 17, 2021

(65) Prior Publication Data

US 2021/0407475 A1 Dec. 30, 2021

(30) Foreign Application Priority Data

Jun. 24, 2020 (JP) ................................ 2020-108572

(51) Int. Cl.
*G10H 1/00* (2006.01)

(52) U.S. Cl.
CPC ......... *G10H 1/0025* (2013.01); *G10H 1/0066* (2013.01); *G10H 2210/105* (2013.01); *G10H 2210/125* (2013.01)

(58) Field of Classification Search
CPC ............... G10H 1/0025; G10H 1/0066; G10H 2210/105; G10H 2210/125
USPC ........................................................... 84/609
See application file for complete search history.

(56) References Cited

U.S. PATENT DOCUMENTS 5,414,209 A * 5/1995 Morita ................. G10H 1/0066 84/645
10,403,254 B2 * 9/2019 Setoguchi ................ G10H 1/06
2003/0121401 A1 * 7/2003 Ito ........................ G10H 1/0083 84/625

(Continued)

FOREIGN PATENT DOCUMENTS

EP 1746774 A1 * 1/2007 ........... G10H 1/0008
JP H06259065 A 9/1994

(Continued)

OTHER PUBLICATIONS

Japanese Office Action dated May 24, 2022 (and English translation thereof) issued in counterpart Japanese Application No. 2020-108572.

(Continued)

*Primary Examiner* — Christina M Schreiber
(74) *Attorney, Agent, or Firm* — Holtz, Holtz & Volek PC

(57) ABSTRACT

A musical performance system includes an instrument and a terminal. Terminal includes a processor. Processor executes outputting first track data or first pattern data obtained by arbitrarily combining pieces of track data. Processor executes automatically outputting second track data or second pattern data obtained by arbitrarily combining pieces of track data. Instrument includes a processor. Processor executes acquiring first track/pattern data from terminal. Processor executes generating a sound of a music composition in accordance with first track/pattern data. Processor executes acquiring second track/pattern data from terminal. Processor executes generating a sound of a music composition in accordance with second track/pattern data.

6 Claims, 8 Drawing Sheets

(56) References Cited

U.S. PATENT DOCUMENTS

| | | | | |
|---|---|---|---|---|
| 2005/0257666 | A1* | 11/2005 | Sakurada | G10H 1/361<br>84/609 |
| 2007/0272073 | A1* | 11/2007 | Hotta | G10H 1/0066<br>84/600 |
| 2017/0084261 | A1* | 3/2017 | Watanabe | G10H 1/0025 |
| 2019/0096379 | A1* | 3/2019 | Iwase | G10H 1/06 |
| 2019/0164529 | A1* | 5/2019 | Kafuku | G06T 13/80 |
| 2019/0295517 | A1* | 9/2019 | Sato | G10H 1/24 |
| 2019/0333488 | A1* | 10/2019 | Wakayama | A63F 13/54 |
| 2021/0201867 | A1* | 7/2021 | Ishimine | G10H 1/34 |
| 2021/0407475 | A1* | 12/2021 | Kafuku | G10H 1/365 |

FOREIGN PATENT DOCUMENTS

| | | | | | |
|---|---|---|---|---|---|
| JP | H07219545 | A | | 8/1995 | |
| JP | 2001184060 | A | * | 7/2001 | |
| JP | 2004126531 | A | * | 4/2004 | G10H 1/0058 |
| JP | 2005234596 | A | * | 9/2005 | |
| JP | 2007093921 | A | * | 4/2007 | |
| JP | 2016118626 | A | | 6/2016 | |
| JP | 2019008336 | A | | 1/2019 | |
| JP | 2019174526 | A | | 10/2019 | |
| WO | WO-2019102730 | A1 | * | 5/2019 | G06F 16/635 |

OTHER PUBLICATIONS

Extended European Search Report (EESR) dated Nov. 25, 2021, issued in counterpart European Application No. 21178903.7.

* cited by examiner

MUSICAL PERFORMANCE SYSTEM, TERMINAL DEVICE, METHOD AND ELECTRONIC MUSICAL INSTRUMENT

CROSS-REFERENCE TO RELATED APPLICATION

This application is based upon and claims the benefit of priority from Japanese Patent Applications No. 2020-108572, filed Jun. 24, 2020. The entire contents of all of which are incorporated herein by reference.

BACKGROUND OF THE INVENTION

1. Field of the Invention

The present invention relates generally to a musical performance system, a terminal device, and a method.

2. Description of the Related Art

An electronic musical instrument including a digital keyboard comprises a processor and a memory, and may be considered to be an embedded computer with a keyboard. In the case of a model provided with an interface such as a universal serial bus (USB) or Bluetooth (Registered Trademark), it is possible to connect the electronic musical instrument with a terminal device (a computer, a smartphone, or a tablet, etc.) and play the electronic musical instrument while operating the terminal device. For example, it is possible to play the electronic musical instrument while playing back an audio source stored in a smartphone on a speaker of the electronic musical instrument.

In recent years, audio source separation technologies have been developed (refer to Jpn. Pat. Appln. KOKAI Publication No. 2019-8336, for example).

By using an audio source separation technology, audio source data can be separated into a plurality of parts of musical performance data. This will allow a user to enjoy playing an electronic musical instrument of a part he/she desires (for example, piano 3), without playing back (generating a sound of) a certain part (for example, piano 3) while playing back (generating a sound of) only certain parts (for example, vocal 1 and guitar 2) on a computer. However, in particular, it is annoying to switch which part should be played while a user is playing. Therefore, simple operation is desired for instructing the playback parts to be switched.

BRIEF SUMMARY OF THE INVENTION

A musical performance system includes an electronic musical instrument and a terminal device. The terminal device includes a processor. The processor executes outputting first track data or first pattern data obtained by arbitrarily combining pieces of track data. The processor executes automatically outputting second track data or second pattern data obtained by arbitrarily combining pieces of track data in accordance with an acquisition of instruction data output from the electronic musical instrument. The electronic musical instrument includes at least one processor. The processor executes acquiring the first track data or the first pattern data output by the terminal device. The processor executes generating a sound of a music composition in accordance with the first track data or the first pattern data. The processor executes outputting the instruction data to the terminal device in accordance with user operation. The processor executes acquiring the second track data or the second pattern data output by the terminal device. The processor executes generating a sound of a music composition in accordance with the second track data or the second pattern data.

The present invention allows a user to instruct playback parts to be switched by a simple operation.

DETAILED DESCRIPTION OF THE PREFERRED EMBODIMENTS

Hereinafter, an embodiment of the present invention will be described with reference to the drawings.

<Configuration>

Figure 1:
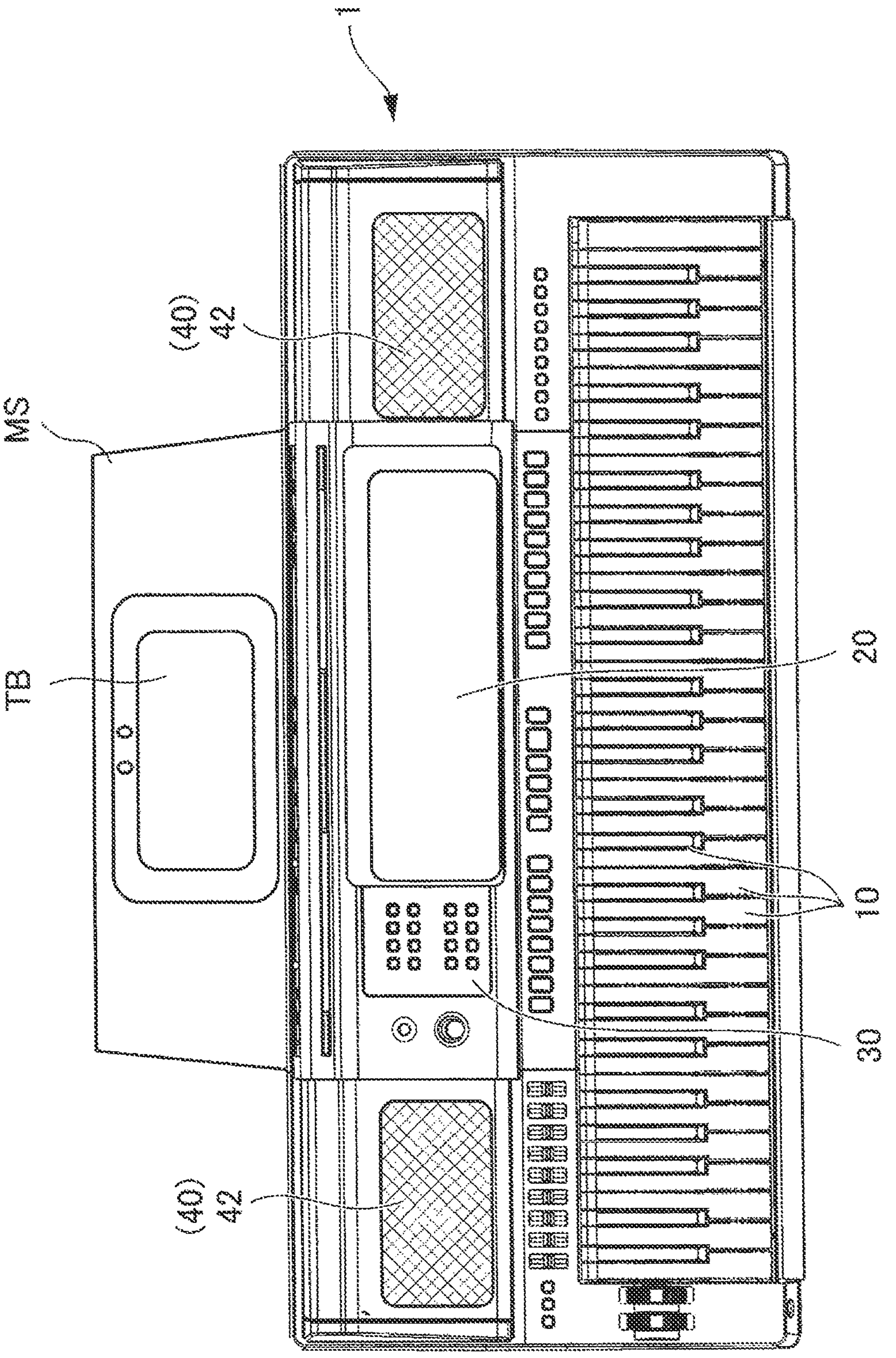
FIG. 1 is an external view showing an example of a musical performance system according to an embodiment.

FIG. 1 is an external view showing an example of a musical performance system according to the embodiment. A digital keyboard 1 is an electronic musical instrument such as an electric piano, a synthesizer, or an electric organ. The digital keyboard 1 includes a plurality of keys 10 arranged on the keyboard, a display unit 20, an operation unit 30, and a music stand MS. As shown in FIG. 1, a terminal device TB connected to the digital keyboard 1 can be placed on the music stand MS.

The key 10 is an operator by which a performer designates a pitch. When the performer presses and releases the key 10, the digital keyboard 1 generates and mutes a sound corresponding to the designated pitch. Furthermore, the key 10 functions as a button for providing an instruction message to a terminal.

The display unit 20 has, for example, a liquid crystal display (LCD) with a touch panel, and displays messages corresponding to an operation made by the performer on the operation unit 30. It should be noted that, in the present embodiment, since the display unit 20 has a touch panel function, it can take on a function of the operation unit 30.

The operation unit 30 is provided with an operation button for the performer to use for various settings, such as volume adjustment, etc. A sound generating unit 40 includes an output unit such as a speaker 42 or a headphone out, and outputs a sound.

Figure 2:
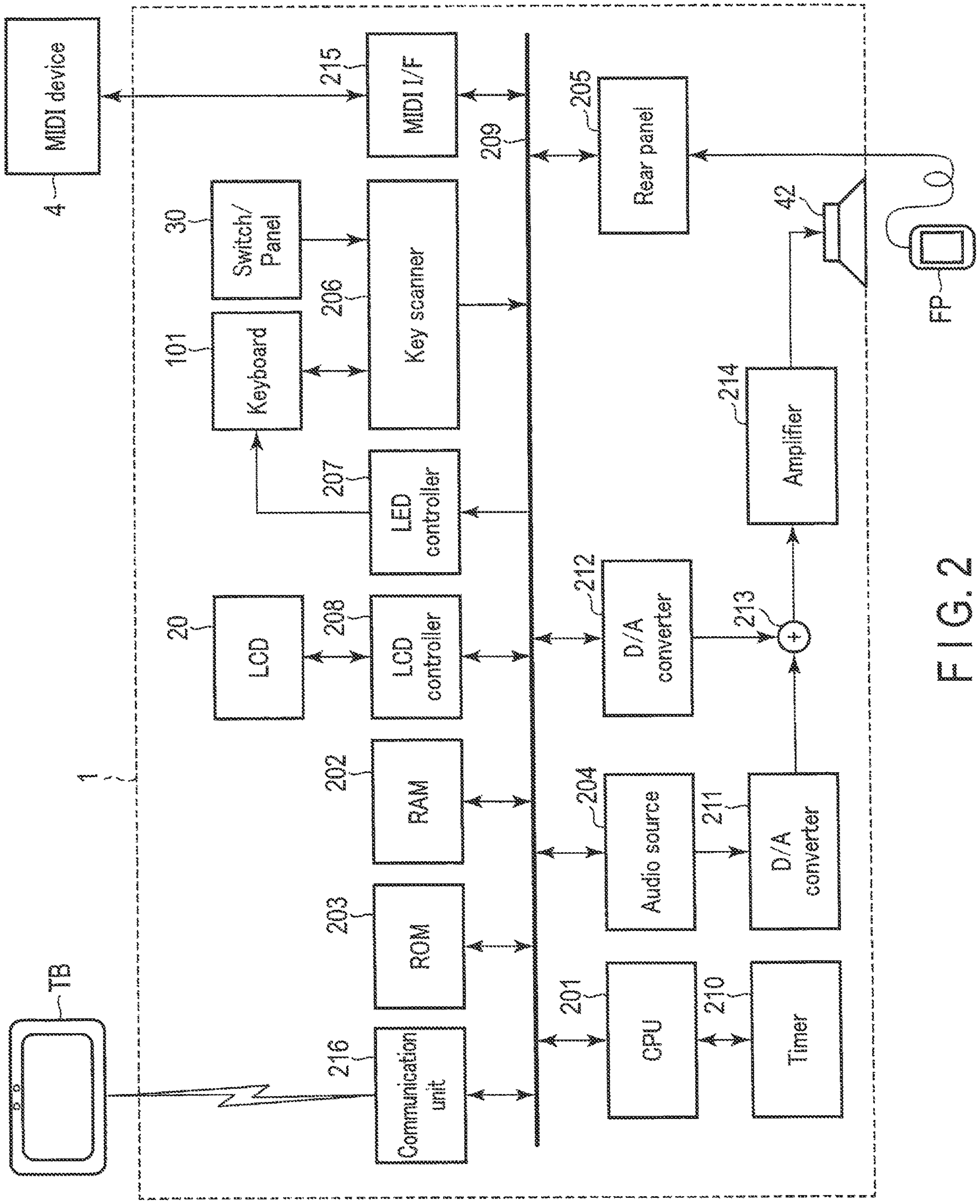
FIG. 2 is a block diagram showing an example of a digital keyboard 1 according to the embodiment.

FIG. 2 is a block diagram showing an example of the digital keyboard 1 according to the embodiment. The digital keyboard 1 includes a communication unit 216, a random access memory (RAM) 202, a read only memory (ROM) 203, an LCD controller 208, a light emitting diode (LED) controller 207, a keyboard 101, a key scanner 206, a MIDI interface (I/F) 215, a bus 209, a central processing unit (CPU) 201, a timer 210, an audio source 204, a digital/analogue (D/A) converter 211, a mixer 213, a D/A converter 212, a rear panel unit 205, and an amplifier 214 in addition to the display unit 20, the operation unit 30, and the speaker 42.

The CPU 201, the audio source 204, the D/A converter 212, the rear panel unit 205, the communication unit 216, the RAM 202, the ROM 203, the LCD controller 208, the LED controller 207, the key scanner 206, and the MIDI interface 215 are connected to the bus 209.

The CPU 201 is a processor for controlling the digital keyboard 1. That is, the CPU 201 reads out a program stored in the ROM 203 the RAM 202 serving as a working memory, executes the program, and realizes various functions of the digital keyboard 1. The CPU 201 operates in accordance with a clock supplied from the timer 210. For example, the clock is used for controlling a sequence of an automatic performance or an automatic accompaniment.

The RAM 202 stores data generated at the time of operating the digital keyboard 1 and various types of setting data, etc. The ROM 203 stores programs for controlling the digital keyboard 1, preset data at the time of factory shipment, and automatic accompaniment data, etc. The automatic accompaniment data may include preset rhythm patterns, chord progressions, bass patterns, or melody data such as obbligatos, etc. The melody data may include pitch information of each note and sound generating timing information of each note, etc.

A sound generating timing of each note may be an interval time between each sound generation, or may be an elapsed time from start of an automatically performed song. A "tick" is mostly used to express a unit of time. The tick is a unit referenced to a tempo of a song, generally used for a sequencer. For example, if the resolution of a sequencer is 480, 1/480 of a time of a quarter note is one tick.

The automatic accompaniment data is not limited to being stored in the ROM 203, and may also be stored in an information storage device or an information storage medium (not shown). The format of the automatic accompaniment data may comply with a file format for MIDI.

The audio source 204 complies with, for example, a general MIDI (GM) standard, that is, a GM audio source. For this type of audio source, if a program change is given as a MIDI message, a tone can be changed, and if a control change is given as a MIDI message, a default effect can be controlled.

The audio source 204 has, for example, a simultaneous sound generating ability of 256 voices at maximum. The audio source 204 reads out music composition waveform data from, for example, a waveform ROM (not shown). The music composition waveform data is converted into an analogue sound composition waveform signal by the D/A converter 211, and input to the mixer 213. On the other hand, digital audio data in the format of mp3, m4a, or wav, etc. is input to the D/A converter 212 via the bus 209. The D/A converter 212 converts the audio data into an analogue waveform signal, and inputs the signal to the mixer 213.

The mixer 213 mixes the analogue sound composition waveform signal and the analogue waveform signal and generates an output signal. The output signal is amplified at the amplifier 214 and is output from an output terminal such as the speaker 42 or the headphone out. The mixer 213, the amplifier 214, and the speaker 42 serve to function as a sound generating unit which provides acoustic output by synthesizing a digital audio signal, etc. received from the terminal device TB and a music composition. That is, the sound generating unit generates the sound of a music composition in accordance with a user's musical performance operation while generating the sound of a music composition in accordance with acquired partial data.

A sound composition waveform signal from the audio source 204 and an audio waveform signal from the terminal device TB are mixed at the mixer 213 and output from the speaker 42. This allows the user to enjoy playing the digital keyboard 1 along with an audio signal from the terminal device TB.

The key scanner 206 constantly monitors a key pressing/key releasing state of the keyboard 101 and a switch operation state of the operation unit 30. The key scanner 206 then reports the states of the keyboard 101 and the operation unit 30 to the CPU 201.

The LED controller 207 is, for example, an integrated circuit (IC). The LED controller 207 navigates a performer's performance by making the key 10 of the keyboard 101 glow based on the instructions from the CPU 201. The LCD controller 208 controls a display state of the display unit 20.

The rear panel unit 205 is provided with, for example, a socket for plugging in a cable cord extending from a foot pedal FP. In many cases, each MIDI terminal of a MIDI-IN, a MIDI-THRU, and a MIDIOUT, and a headphone jack are also provided on the rear panel unit 205.

The MIDI interface 215 inputs a MIDI message (musical performance data, etc.) from an external device such as a MIDI device 4 connected to the MIDI terminal and outputs the MIDI message to the external device. The received MIDI message is passed over to the audio source 204 via the CPU 201. The audio source 204 makes a sound according to the tone, volume, and timing, etc. designated by the MIDI message. It should be noted that the MIDI message and the MIDI data file can also be exchanged with the external device via a USB.

The communication unit 216 is provided with a wireless communication interface such as the BlueTooth (Registered Trademark) and can exchange digital data with a paired terminal device TB. For example, MIDI data (musical performance data) generated by playing the digital keyboard 1 can be transmitted to the terminal device TB via the communication unit 216 (the communication unit 216 functions as an output unit). The communication unit 216 also functions as a receiving unit (acquisition unit) for receiving a digital audio signal, etc. transmitted from the terminal device TB.

Furthermore, storage media, etc. (not shown) may also be connected to the bus 209 via a slot terminal (not shown), etc. Examples of the storage media are a USB memory, a flexible disk drive (FDD), a hard disk drive (HDD), a CD-ROM drive, and an optical magnetic disk (MO) drive. In the case where a program is not stored in the ROM 203, the CPU 201 can execute the same operation as in the case where a program is stored in the ROM 203 by storing the program in storage media and reading it on the RAM 202.

Figure 3:
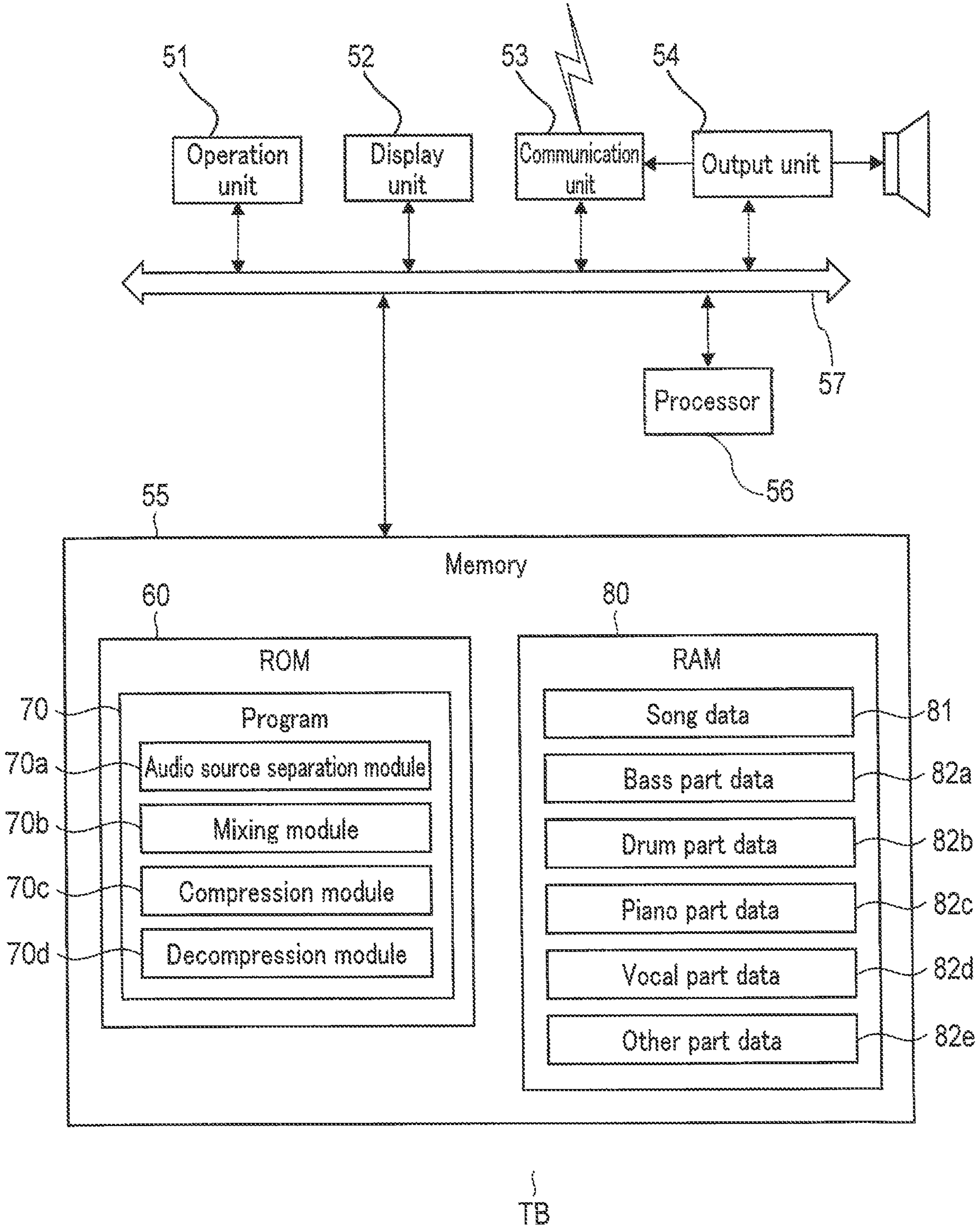
FIG. 3 is a functional block diagram showing an example of a terminal device TB.

FIG. 3 is a functional block diagram showing an example of the terminal device TB. The terminal device TB of the embodiment is, for example, a tablet information terminal on which application software relating to the embodiment is installed. It should be noted that the terminal device TB is not limited to a tablet portable terminal and may be a laptop or a smartphone, etc.

The terminal device TB mainly includes an operation unit 51, a display unit 52, a communication unit 53, an output unit 54, a memory 55, and a processor 56. Each unit (the operation unit 51, the display unit 52, the communication unit 53, the output unit 54, the memory 55, and the processor 56) is connected to a bus 57, and is configured to exchange data via the bus 52.

The operation unit 51 includes, for example, switches such as a power switch for turning ON/OFF the power. The display unit 52 has a liquid crystal monitor with a touch panel and displays an image. Since the display unit 52 also has a touch panel function, it can serve as a part of the operation unit 51.

The communication unit 53 is provided with a wireless unit or a wired unit for communicating with other devices, etc. In the embodiment, the communication unit 53 is assumed to be wirelessly connected to the digital keyboard 1 via BlueTooth (Registered Trademark). That is, the terminal device TB can exchange digital data with a paired digital keyboard 1 via BlueTooth (Registered Trademark).

The output unit 54 is provided with a speaker and an earphone jack, etc., and plays back and outputs analogue audio or a music composition. Furthermore, the output unit 54 outputs a remix signal that has been digitally synthesized by the processor 56. The remix signal can be communicated to the digital keyboard 1 via the communication unit 53.

The processor 56 is an arithmetic chip such as a CPU, a micro processing unit (MPU), an application specification integrated circuit (ASIC), or a field-programmable gate array (FPGA), and controls the terminal device TB. The processor 56 executes various kinds of processing in accordance with a program store in the memory 55. It should be noted that a digital signal processor (DSP), etc. that specializes in processing digital audio signals may also be referred to as a processor.

The memory 55 comprises a ROM 60 and a RAM 80. The RAM 80 stores data necessary for operating a program 70 stored in the ROM 60. The RAM 80 also functions as a temporary storage region, etc. for developing data created by the processor 56, MIDI data transmitted from the digital keyboard 1, and an application.

In the embodiment, the RAM 80 stores song data 81 that is loaded by a user. The song data 81 is in a digital format such as mp3, m4a, or wav, and, in the embodiment, is assumed to be a song including five or more parts. It should be noted that the song should include at least two parts.

The ROM 60 stores the program 70 which causes the terminal device TB serving as a computer to function as a terminal device according to the embodiment. The program 70 includes an audio source separation module 70*a*, a mixing module 70*b*, a compression module 70*c*, and a decompression module 70*d*.

The audio source separation module 70*a* separates the song data 81 into a plurality of audio source parts by an audio source separation engine using, for example, a DNN trained model. A song includes, for example, a bass part, a drum part, a piano part, a vocal part, and other parts (guitar, etc.). In this case, as shown in FIG. 3, the song data 81 is separated into bass part data 82*a*, drum part data 82*b*, piano part data 82*c*, vocal part data 82*d*, and other part data 82*e*. Each of the obtained part data is stored in the RAM 80 in, for example, a wav format. It should be noted that a "part" may also be referred to as a "stem" or a "track", all of which are the same concept.

The mixing module 70*b* mixes each audio signal (data) of the bass part data 82*a*, the drum part data 82*b*, the piano part data 82*c*, the vocal part data 82*d*, and the other part data 62*e* in a ratio according to the instruction message provided by the digital keyboard 1, and creates a remix signal.

That is, the terminal device TB outputs first track data of song data or first pattern data which is a combination of a plurality of pieces of track data in accordance with an acquisition of first instruction data output from the digital keyboard 1. Subsequently, the terminal device TB automatically outputs second track data of the song data or second pattern data which is a combination of a plurality of pieces of the track data in accordance with an acquisition of second instruction data.

For example, the terminal device TB acquires each piece of the audio source-separated track data in a certain combination according to the acquisition of instruction data, and outputs the data to the digital keyboard 1 as a remix signal.

The compression module 70*c* compresses at least one of each of the audio signals (data) of the bass part data 82*a*, the drum part data 82*b*, the piano part data 82*c*, the vocal part data 82*d*, or the other part data 82*e*, and stores the data in the RAM 80. This allows an occupied area of the RAM 80 to be reduced and provides an advantage of increasing the number of songs or parts that can be pooled. In the case where the part data is compressed, the decompression module 70*d* reads out the compressed data from the RAM 80, decompresses the data, and passes it over to the mixing module 70*b*.

Figure 4:
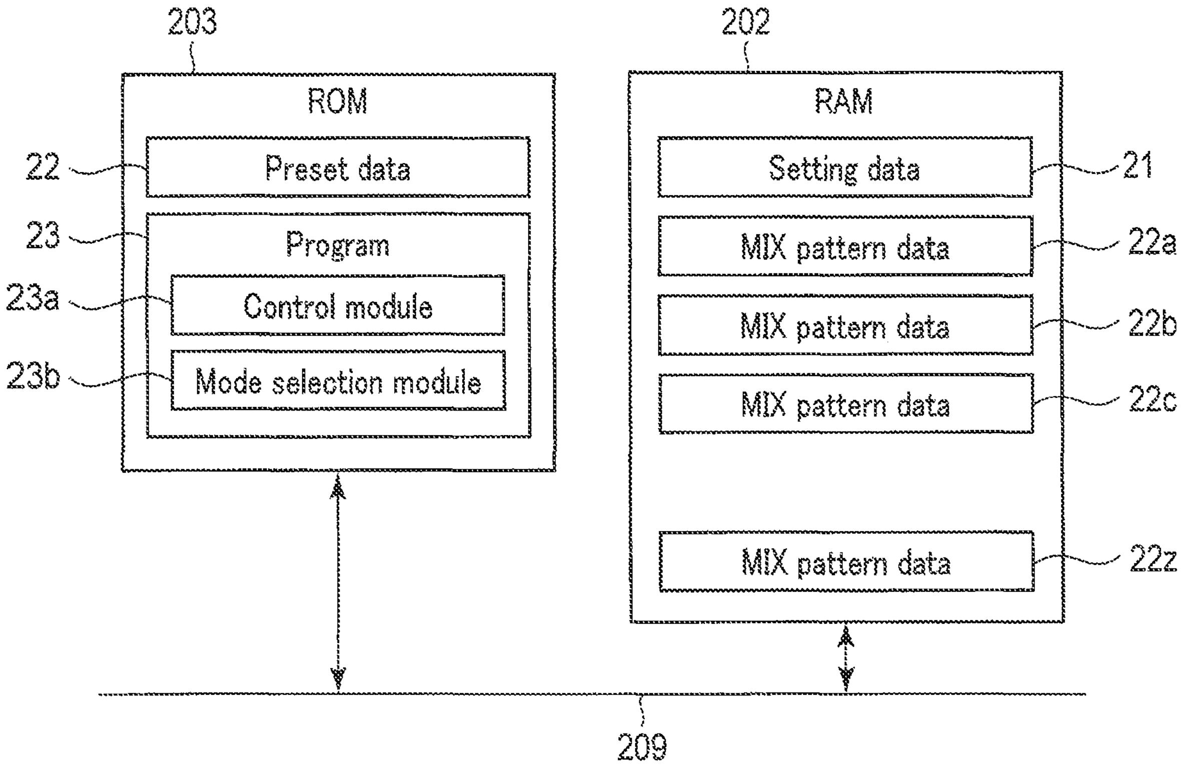
FIG. 4 shows an example of information stored in a ROM 203 and a RAM 202 of the digital keyboard 1.

FIG. 4 shows an example of information stored in the ROM 203 and the RAM 202 of the digital keyboard 1. The RAM 202 stores a plurality of pieces of MIX pattern data 22*a* to 22*z* in addition to setting data 21.

The ROM 203 stores preset data 22 and a program 23. The program 23 causes the digital keyboard 1 serving as a computer to function as the electronic musical instrument according to the embodiment. The program 23 includes a control module 23*a* and a mode selection module 23*b*.

The control module 23*a* generates an instruction message for the terminal device TB in accordance with the user's operation on an operation button (operation unit 30) serving as an operator or the key 10, and transmits the message to the terminal device TB via the bus 209. The instruction message is generated by reflecting one of the pieces of the MIX pattern data 22*a* to 22*z* stored in the RAM 202.

That is, the MIX pattern data 22*a* to 22*z* is data for individually setting a mixing pattern of the bass part data 82*a*, the drum part data 82*b*, the piano part data 82*c*, the vocal part data 82*d*, and the other part data 82*e* that have been separated from a song. That is, by calling out one of the pieces of the MIX pattern data 22*a* to 22*z*, a mix ratio of each piece of part data stored in the terminal device TB can be changed freely.

For example, the terminal device TB should be able to acquire each piece of audio source separated-track data in a certain combination according to the acquisition of the instruction data. The combination pattern may include a pattern in which all pieces of track data in the song data are selected simultaneously, or may be set in advance as a first pattern, a second pattern, and a third pattern. The terminal device TB should be able to switch patterns to be selected according to the instruction data.

The mode selection module 23*b* provides functions necessary for a user to designate operation modes of the keyboard 101. That is, the mode selection module 23*b* exclusively switches between a normal first mode and a second mode for controlling the terminal device TB by the keyboard 101. Here, the first mode is a normal musical performance mode, and generates a music composition by a performance operation on the key 10. The second mode generates an instruction message in accordance with an operation on the key 10 set in advance.

As the instruction message, a program change or a control change which is a MIDI message can be used. Other MIDI signals or digital messages with a dedicated format may also be used. Furthermore, a trigger for generating the instruction message may not only be caused by operating the key 10, but also by operating the operation button of the operation unit 30 or by pressing/releasing the foot pedal FP.

<Operation>

The operation of the above configuration will be described below.

Figure 5:
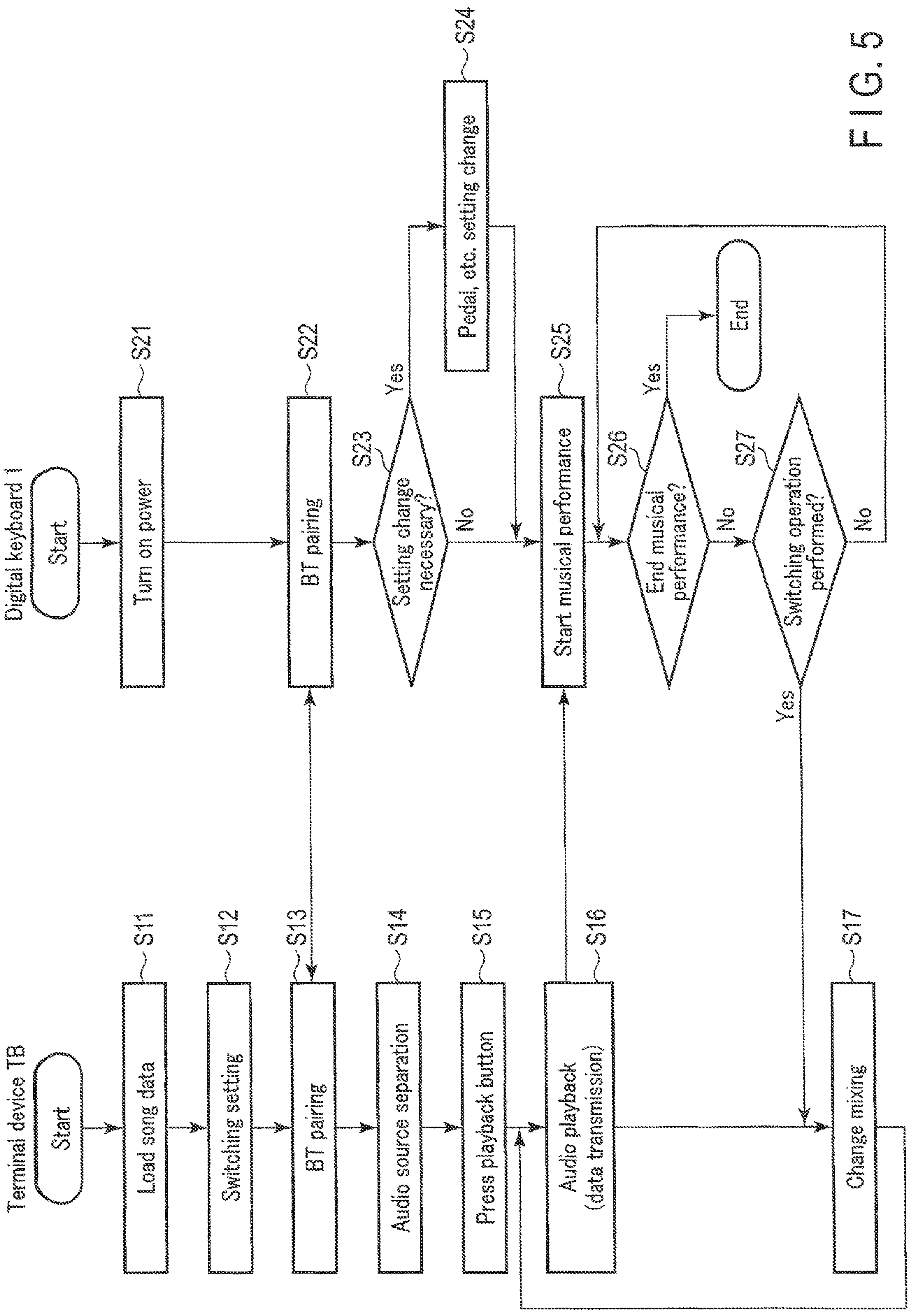
FIG. 5 is a flowchart showing an example of processing procedures of the terminal device TB and the digital keyboard 1 according to the embodiment.

FIG. 5 is a flowchart showing an example of processing procedures of the terminal device TB and the digital keyboard 1 according to the embodiment. In FIG. 5, when the power is turned on (step S21), the digital keyboard 1 waits for the terminal device TB to perform a BT (BlueTooth (Registered Trademark)) pairing operation (step S22).

When an application of the terminal device TB is activated by a user's operation, the terminal device TB displays a song selection graphical user interface (GUI) on the display unit 52 to encourage the user to select a song. When a desired song is selected by the user (Open), the terminal device TB loads the song data 81 (step S11). The terminal device TB then determines the setting of how the MIX pattern should be switched in accordance with the user's operation (step S12). That is, it is determined how the instruction message is to be provided for switching the MIX pattern.

The following four cases may be assumed for the switching setting in step S12.

(A Case in which Dedicated Buttons are Provided on the Digital Keyboard 1 Side (Case 1))

If dedicated buttons are provided on the operation unit 30 of the digital keyboard 1, mixing numbers or settings such as proceeding to the next step or returning to the step before are assigned to the buttons. This allows the performer to enjoy performing music without being influenced by the mixing settings.

(A Case in which a Triple Pedal is Provided, without Dedicated Buttons (Case 2))

If a so-called triple pedal is used as the foot pedal FP, musical performance may be less affected by assigning a mixing selection function to a pedal (for example, a sostenuto pedal) that is less frequently used during a musical performance.

(A Case in which One Pedal is Provided, without Dedicated Buttons (Case 3))

One foot pedal FP may be used to recursively switch among a plurality of MIX patterns. In this case, every time the foot pedal FP is operated, the control module 23*a* of the digital keyboard 1 sends an instruction message for recursively switching the MIX patterns that are preset with different settings to the terminal device TB.

(A Case in which No Dedicated Buttons or Pedals are Provided (Case 4))

The mixing selection function may be assigned to a lowest note or a highest note of the keyboard 101, etc. Since such notes correspond to keys that are not frequently used, their influence on the performance can be kept to a minimum.

The terminal device TB then performs pairing of the digital keyboard 1 and the BlueTooth (Registered Trademark) based on the user operation (step S13). After completing the pairing, the information on the switching setting provided in step S12 is also sent to the digital keyboard 1.

Based on the information on the switching setting obtained from the terminal device TB, the digital keyboard 1 determines whether or not it is necessary to change the internal setting (step S23), and, if necessary (Yes), changes the setting in the following manner (step S24).

(Case 1)

No change is to be made on the setting.

(Case 2)

(A Case in which a Sostenuto Pedal is Used for Switching)

Even if the sostenuto pedal is operated, the sostenuto function is to be turned off.

(Case 3)

(A Case in Which a Damper Pedal is Used for Switching)

Even if the damper pedal is stepped on, the damper function is to be turned off.

(Case 4)

The sound of the assigned key is to be muted.

The terminal device TB then separates the song data 81 loaded in step S11 into a plurality of music components, that is, into each part (step S14). Therefore, as shown in FIG. 3, pieces of data 82*a* to 82*e* are created respectively for a vocal part, a piano part, a drum part, a bass part, and other parts, and are developed on the RAM 80.

When a play button of the GUI is tapped by the user (step S15), the terminal device TB starts audio playback (step S16) and creates a remix signal by mixing each piece of part data 82*a* to 82*e* in accordance with the determined MIX pattern setting. The remix signal is sent to the digital keyboard 1 side via the BlueTooth (Registered Trademark) (data transmission) and is output from the speaker 42. Furthermore, when the user's performance is started (step S25), the performed music composition is also output from the speaker 42. It should be noted that the play button may also be provided on the digital keyboard 1 side instead of the terminal device TB side.

While the musical performance continues (step S26: No), the digital keyboard 1 waits for the switching operation (step S27). When the switching operation of the MIX pattern is performed (step S27: Yes), the terminal device TB changes the mixing of each part in accordance with the instruction message provided by this switching operation (step S17).

FIGS. 6A to 6C and FIGS. 7A to 7C show examples of the GUI displayed on the display unit 52 of the terminal device TB. For example, situations such as practicing or performing in sessions may be considered.

<Examples of Practicing>

Figure 6A:
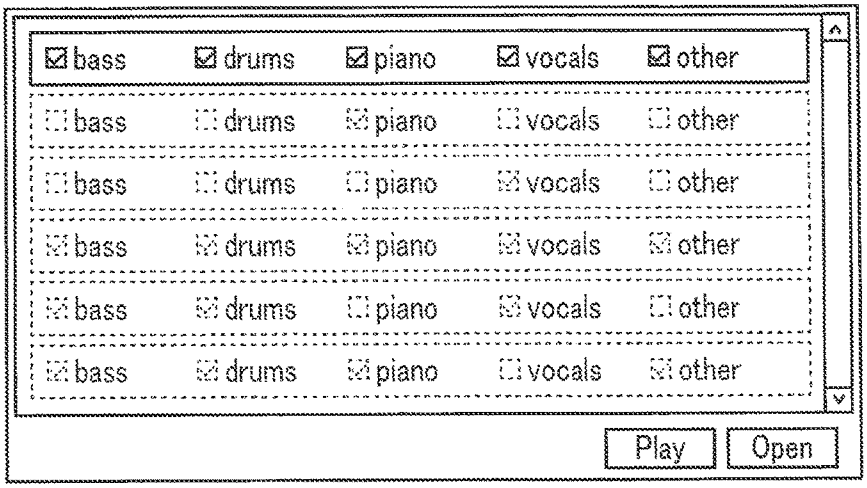
FIG. 6A shows an example of a GUI displayed on a display unit 52 of the terminal device TB.

At the time of starting a musical performance, the GUI is, for example, in a state of FIG. 6A. In this setting, an audio source in which all of the separated parts are simply added and mixed together is generated and played back from the speaker 42 of the digital keyboard 1.

Figure 6B:
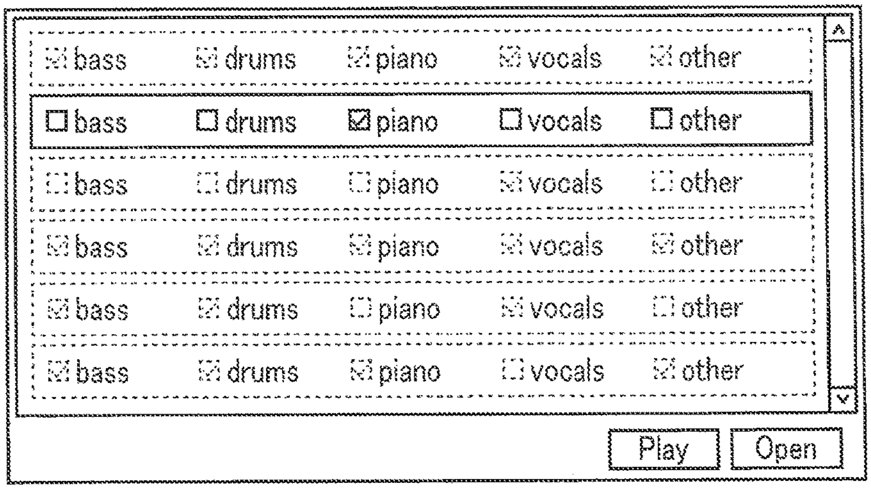
FIG. 6B shows an example of a GUI displayed on the display unit 52 of the terminal device TB.

For example, when the user steps on the foot pedal FP at the end of an introduction, the MIX pattern is switched, and an instruction message is sent to the terminal device TB via the BlueTooth (Registered Trademark). In accordance with this operation, the terminal device TB transitions to the next state, and the GUI screen changes in the manner shown in, for example, FIG. 6B. FIG. 6B shows that only the piano is playing. By playing the chords while listening to this piano performance, the user is able to memorize the chords played in this song.

Figure 6C:
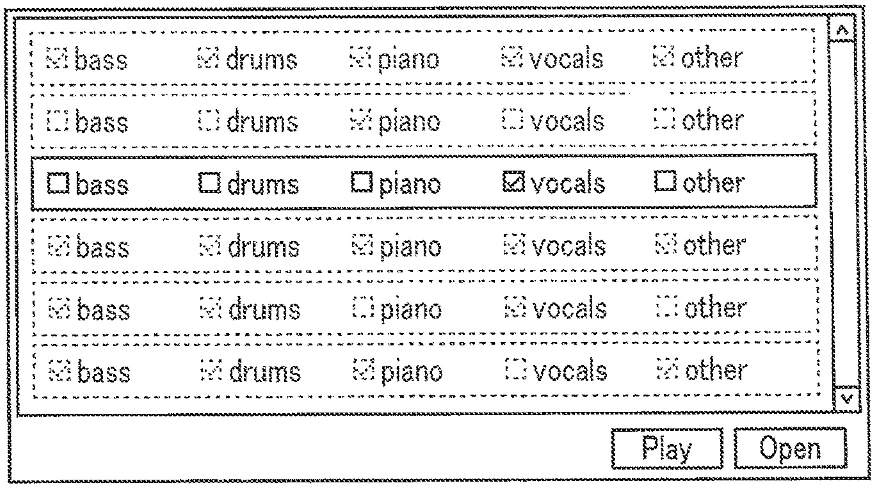
FIG. 6C shows an example of a GUI displayed on the display unit 52 of the terminal device TB.

Furthermore, for example, when the user steps on the foot pedal FP at the chorus part of the song, the MIX pattern is switched to the next MIX pattern, and the instruction message is sent to the terminal device TB via the BlueTooth (Registered Trademark). In accordance with this operation, the terminal device TB transitions to the next state, and the GUI screen changes in the manner shown in, for example, FIG. 6C. FIG. 6C shows that only the vocal is playing. By playing the melody line of the vocal while listening to the vocal, the user is able to memorize the melody played in this song.

By stepping on the pedal again, the terminal device TB returns to the state of FIG. 6A again. Furthermore, since the user is able to turn ON/OFF each of the audio sources freely, the user is also able to set other states for the terminal device TB.

When the user is more or less familiarized with the above settings, the user may proceed to the session step.

<Examples of Performing in Sessions>

Figure 7A:
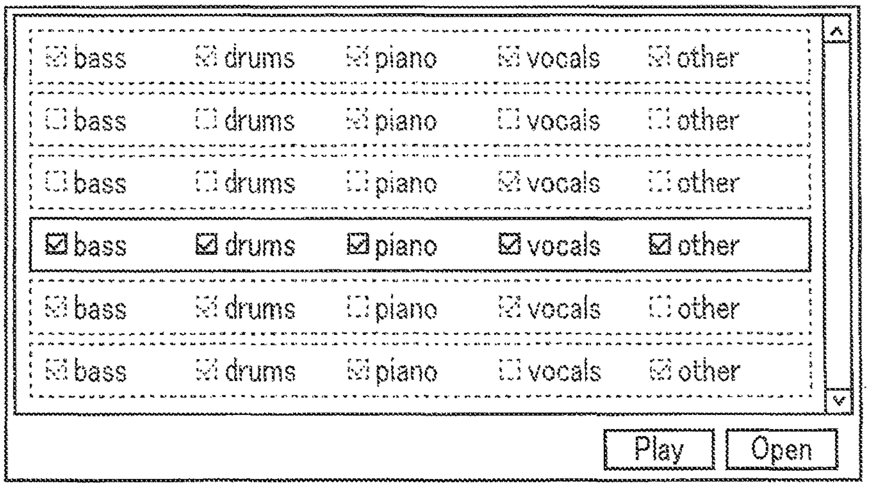
FIG. 7A shows an example of a GUI displayed on the display unit 52 of the terminal device TB.

At the time of starting a musical performance, the GUI is, for example, in a state of FIG. 7A. In this setting, an audio source in which all of the separated parts are simply added and mixed together is generated and played back from the speaker 42 of the digital keyboard 1.

Figure 7B:
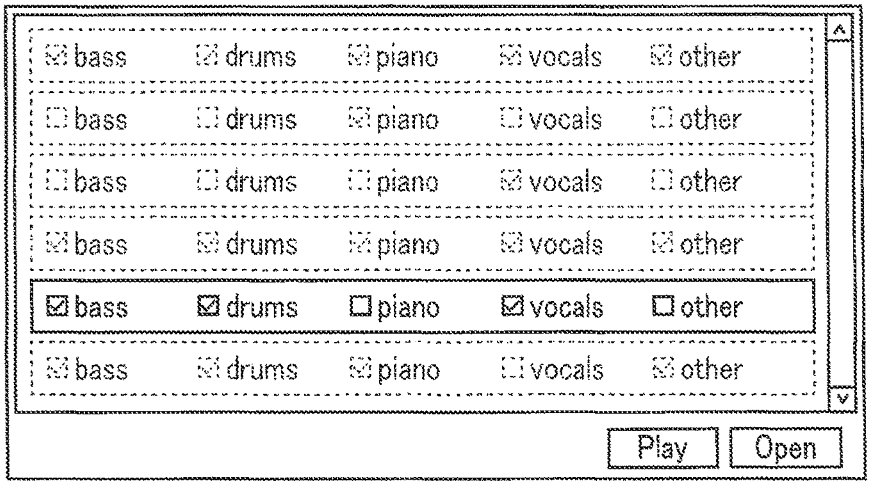
FIG. 7B shows an example of a GUI displayed on the display unit 52 of the terminal device TB.
Figure 7C:
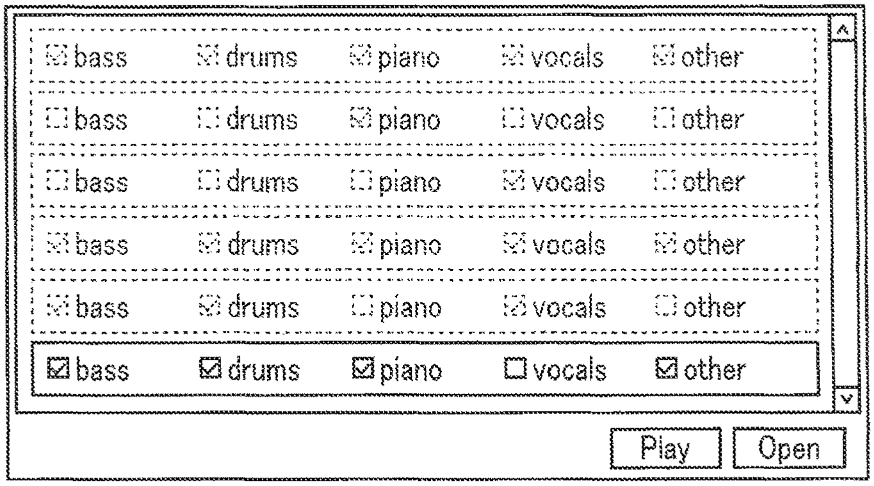
FIG. 7C shows an example of a GUI displayed on the display unit 52 of the terminal device TB.

For example, when the user steps on the foot pedal FP at the end of an introduction, the MIX pattern is switched, and an instruction message is sent to the terminal device TB via the BlueTooth (Registered Trademark). In accordance with this operation, the terminal device TB transitions to the next state, and the GUI screen changes in the manner shown in, for example, FIG. 7B. Since FIG. 7B shows a setting in which the bass, the drum, and the vocal are added and mixed, an audio source that lacks the sound of chords is generated. By playing the chords practiced in FIG. 6B while listening to this audio source, the user can enjoy a session with an actual audio source.

Furthermore, for example, when the user steps on the foot pedal FP at the chorus part of the song, the MIX pattern is switched to the next MIX pattern, and an instruction message is sent to the terminal device TB via the BlueTooth (Registered Trademark). In accordance with this operation, the terminal device TB transitions to the next state, and the GUI screen chances in the manner shown in, for example, FIG. 7C. According to the setting of FIG. 7C, an audio source in which all of the parts except for the vocal part are added and mixed is generated. By playing the melody line of the vocal practiced in FIG. 6C while listening to this audio source, the user can enjoy a session with an actual audio source.

By stepping on the pedal again, the terminal device TB returns to the state of FIG. 7A again. Furthermore, since the user is able to turn ON/OFF each of the audio sources freely, the user is able to set other states for the terminal device TB.

Figure 8:
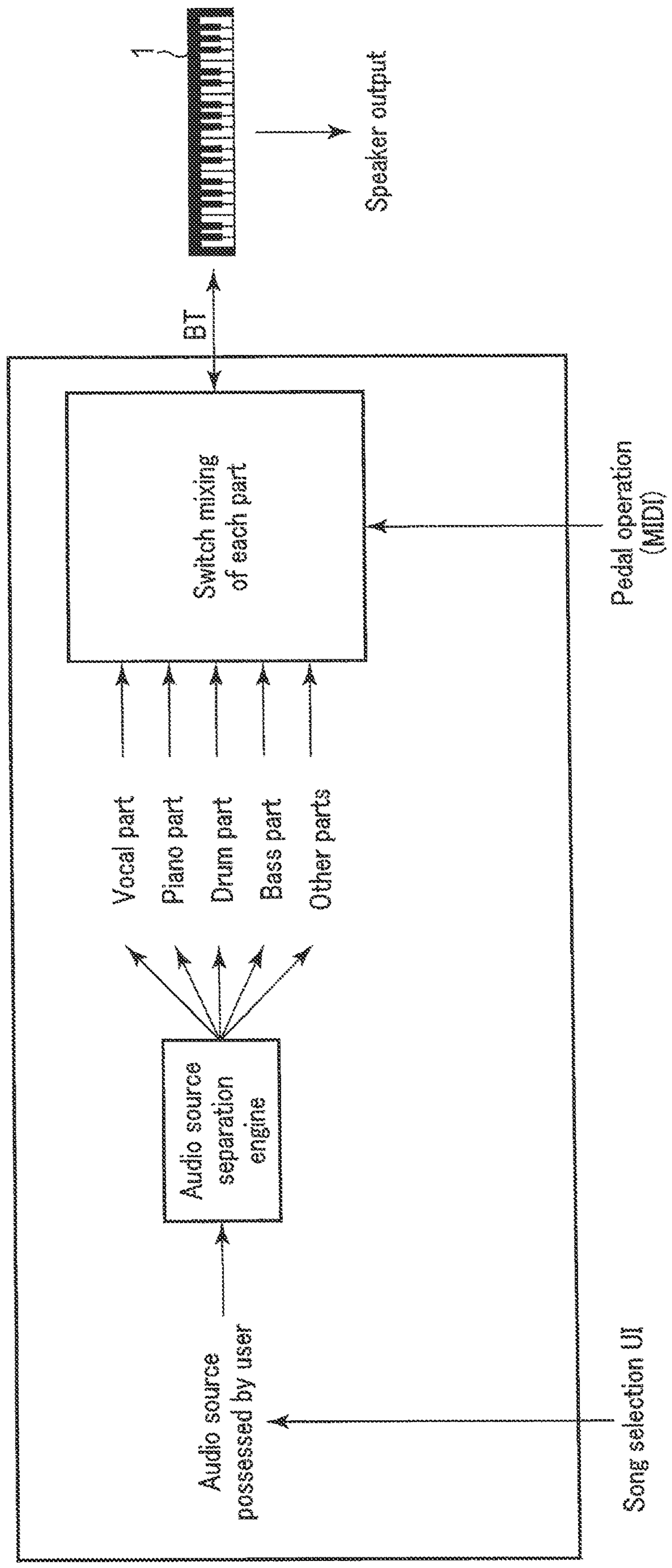
FIG. 8 is a conceptual view showing an example of a processing procedure in the embodiment.

FIG. 8 is a conceptual view showing an example of a processing procedure in the embodiment. When an audio source possessed by the user is selected by a song selection UI of the terminal device TB, the audio source is separated into a plurality of parts by the audio source separation engine. An instruction message (for example, a MIDI signal) is then provided to the terminal device TB by, for example, a pedal operation, and a mixing ratio of each part is changed. An audio signal created based on the set mixing is transferred to the digital keyboard 1 via the BlueTooth (Registered Trademark) and is acoustically output from the speaker together with the user's musical performance.

As explained above, in the embodiment, a song designated by the user is separated into a plurality of parts by the audio source separation engine on the terminal device TB side. On the other hand, the mix ratio of the separated parts is switched freely by the instruction message from the digital keyboard 1, and a remixed audio source is created by the terminal device TB. The remixed audio source is transferred to the digital keyboard 1 from the terminal device TB via the BlueTooth (Registered Trademark) and is acoustically output together with the user's musical performance. This allows the mixing of the parts of the audio source output from the terminal device (the terminal device may be included in the electronic musical instrument) to be changed freely by a simple operation on the electronic musical instrument side.

For example, when practicing a song, the user can delete a part that the user is not performing from the original song and change the part in the middle of the performance. When performing in a session, the user can delete the part to be performed by the user from the original song, and change the part in the middle of the song during the performance. Furthermore, the audio source mixed after the audio source separation and the audio source performed by the user can be listened to simultaneously on the same speaker (or headphone, etc.) without having to prepare two separate speakers (headphones).

For example, assuming a case of practicing an assigned song in pop music using a keyboard instrument, people have different preferences for how to practice, and teachers recommend different methods, as shown below.

- A person who wishes to practice while listening to the entire original song.
- A person who wishes to practice while listening only to the piano.
- A person who wishes to practice while listening only to the vocal.
- A person who wishes to practice while listening to a minus one audio source (an audio source from which only the piano performance is removed).
- A person who wishes to practice while listening to a minus one audio source (an audio source from which only the vocal performance is removed).

In the existing technology, it has been difficult for a performer to switch the mix of a song played in the background by performing an operation on an instrument the performer is practicing while the song is being played back. According to the present invention, the remixed audio source and the performer's performance can be listened to simultaneously on the same speakers (or headphone).

According to the present embodiment, the mix ratio of the separated audio source can be switched by a simple operation, and can easily be listened to together with the user's performance. Therefore, according to the embodiment, the present invention can provide a musical performance system, a terminal device, an electronic musical instrument, a method, and a program that allow separated parts of a song to be appropriately mixed and output while performing music, and can enhance a user's motivation to practice music. This will enable a user to further enjoy playing or practicing an instrument.

The present invention is not limited to the above-described embodiment.

<Modification of Button Operator>

When there are five patterns of mixing, for example, mixes among Mixes 1 to 5 that are often used are assigned to button 1 to button 3 of the digital keyboard 1 (Mix 4 is assigned to button 1, and Mix 2 is assigned to button 2, etc.). The mixing pattern to be played back may be switched in accordance with the pressed button on the digital keyboard 1 side during a musical performance.

Examples of the setting (pattern) are as follows.

Mix 1: Parts other than vocal

Mix 2: Parts other than piano

Mix 3: No drums

Mix 4: Only vocal

Mix 5: All MIX

The mix of the song to be played in the background may be switched during a musical performance or at a transition between songs in accordance with the part played (or sung) by the user. That is, since a song to be played in the background can be easily changed while performing a song, the song may be listened to with a sense of freshness, and the user can practice without getting bored.

Furthermore, in addition to setting the mixing ratio of each part to 100% or 0%, in the case where the user wishes to leave a little bit of vocal, etc., the vocal can be designated to an intermediate ratio such as 20%. Furthermore, the means for generating the instruction message is not limited to the foot pedal FP, and can be any means as long as it generates a default MIDI signal.

Furthermore, instead of triggering the start of the audio source playback by a touch operation on the terminal device TB, any operation (foot pedal, etc.) performed by the digital keyboard 1 side may be set to start the audio source playback. In addition, functions that are familiar in practicing applications, such as changing playback speed, rewinding, and loop playback, may also be provided.

The electronic musical instrument is not limited to the digital keyboard 1, and may be a stringed instrument or a wind instrument.

The present invention is not limited to the specifics of the embodiment. For example, in the embodiment, a tablet portable terminal that is provided separately from the digital keyboard 1 has been assumed as the terminal device TB. However, the terminal device TB is not limited to the above, and may also be a desktop or a laptop computer.

Alternatively, the digital keyboard itself may be provided with a function of an information processing device.

Furthermore, the terminal device TB may be connected to the digital keyboard 1 in a wired manner via, for example, a USB cable.

Furthermore, the technical scope of the present invention includes various modifications and improvements, etc. in the range of achieving the object of the present invention, which is obvious to a person with ordinary skill in the art from the scope of claims.

What is claimed is:

1. A musical performance system comprising:

an electronic musical instrument including a speaker and at least one processor; and a terminal device including a processor, wherein the electronic musical instrument and the terminal device are communicably connected;

wherein the processor of the terminal device is configured to:

acquire, from a memory, music composition data selected by a user, the music composition data being in a digital audio format, the music composition data being music composition data of a music composition including a plurality of parts, each part of the music composition corresponding to a musical element of the music composition including at least one of a musical instrument part in the music composition and a vocal part in the music composition;

acquire a plurality of pieces of track data respectively corresponding to the plurality of parts of the music composition, the plurality of pieces of track data being obtained by audio source separation processing performed on the music composition data to separate the music composition data into the plurality of pieces of track data;

receive, from the electronic musical instrument, a first instruction to remix one or more of the plurality of pieces of track data into a first remix signal in accordance with a first mixing pattern, the first mixing pattern specifying one or more of the plurality of pieces of track data to be included in the first remix signal, the first instruction being output from the electronic musical instrument in accordance with a first user operation;

create the first remix signal by mixing the one or more of the plurality of pieces of track data specified by the first mix pattern; and output the created first remix signal to the electronic musical instrument, wherein the at least one processor of the electronic musical instrument is configured to:

acquire the first remix signal output by the terminal device;

generate and output, via the speaker, a sound of the music composition in accordance with the first remix signal; and output a second instruction to the terminal device in accordance with a second user operation, wherein the processor of the terminal device is further configured to:

receive, from the electronic musical instrument, the second instruction, the second instruction instructing the processor to remix one or more of the plurality of pieces of track data into a second remix signal in accordance with a second mixing pattern different from the first mixing pattern, the second mixing pattern specifying one or more of the plurality of pieces of track data to be included in the second remix signal such that the second remix signal differs from the first remix signal;

create the second remix signal by mixing the one or more of the plurality of pieces of track data specified by the second mix pattern; and output the second remix signal to the electronic musical instrument, and wherein the at least one processor of the electronic musical instrument is further configured to:

acquire the second remix signal output by the terminal device; and generate and output, via the speaker, a sound of the music composition in accordance with the second remix signal, the sound of the music composition generated in accordance with the second remix signal at least partially differing from the sound of the music composition generated in accordance with the first remix signal.

2. The musical performance system according to claim 1, wherein the electronic musical instrument includes a musical performance operator, and the user operation includes an operation to the musical performance operator.

3. The musical performance system according to claim 1, wherein the electronic musical instrument includes a pedal operator, and the user operation includes an operation to the pedal operator.

4. A terminal device comprising:

a processor, wherein the processor is configured to:

acquire, from a memory, music composition data selected by a user, the music composition data being in a digital audio format, the music composition data being music composition data of a music composition including a plurality of parts, each part of the music composition corresponding to a musical element of the music composition including at least one of a musical instrument part in the music composition and a vocal part in the music composition;

acquire a plurality of pieces of track data respectively corresponding to the plurality of parts of the music composition, the plurality of pieces of track data being obtained by audio source separation processing performed on the music composition data to separate the music composition data into the plurality of pieces of track data;

receive, from an electronic musical instrument that is communicably connected to the terminal device, a first instruction to remix one or more of the plurality of pieces of track data into a first remix signal in accordance with a first mixing pattern, the first mixing pattern specifying one or more of the plurality of pieces of track data to be included in the first remix signal, the first instruction being output from the electronic musical instrument in accordance with a first user operation;

create the first remix signal by mixing the one or more of the plurality of pieces of track data specified by the first mix pattern;

output the created first remix signal to the electronic musical instrument, wherein the electronic musical instrument is configured to generate and output, via a speaker, a sound of the music composition in accordance with the first remix signal;

receive, from the electronic musical instrument, a second instruction output from the electronic musical instrument in accordance with a second user operation, the second instruction instructing the processor to remix one or more of the plurality of pieces of track data into a second remix signal in accordance with a second mixing pattern different from the first mixing pattern, the second mixing pattern specifying one or more of the plurality of pieces of track data to be included in the second remix signal such that the second remix signal differs from the first remix signal;

create the second remix signal by mixing the one or more of the plurality of pieces of track data specified by the second mix pattern; and output the second remix signal to the electronic musical instrument, wherein the electronic musical instrument is configured to generate and output, via the speaker, a sound of the music composition in accordance with the second remix signal, the sound of the music composition generated in accordance with the second remix signal at least partially differing from the sound of the music composition generated in accordance with the first remix signal.

5. A method executed by a terminal device comprising a processor, the method comprising:

acquiring, from a memory, music composition data selected by a user, the music composition data being in a digital audio format, the music composition data being music composition data of a music composition including a plurality of parts, each part of the music composition corresponding to a musical element of the music composition including at least one of a musical instrument part in the music composition and a vocal part in the music composition;

acquiring a plurality of pieces of track data respectively corresponding to the plurality of parts of the music composition, the plurality of pieces of track data being obtained by audio source separation processing performed on the music composition data to separate the music composition data into the plurality of pieces of track data;

receiving, from an electronic musical instrument that is communicably connected to the terminal device, a first instruction to remix one or more of the plurality of pieces of track data into a first remix signal in accordance with a first mixing pattern, the first mixing pattern specifying one or more of the plurality of pieces of track data to be included in the first remix signal, the first instruction being output from the electronic musical instrument in accordance with a first user operation;

creating the first remix signal by mixing the one or more of the plurality of pieces of track data specified by the first mix pattern;

outputting the created first remix signal to the electronic musical instrument, wherein the electronic musical instrument generating and outputting, via a speaker, a sound of the music composition in accordance with the first remix signal;

receiving, from the electronic musical instrument, a second instruction output from the electronic musical instrument in accordance with a second user operation, the second instruction instructing the processor to remix one or more of the plurality of pieces of track data into a second remix signal in accordance with a second mixing pattern different from the first mixing pattern, the second mixing pattern specifying one or more of the plurality of pieces of track data to be included in the second remix signal such that the second remix signal differs from the first remix signal;

creating the second remix signal by mixing the one or more of the plurality of pieces of track data specified by the second mix pattern; and outputting the second remix signal to the electronic musical instrument, wherein the electronic musical instrument is configured to generate and output, via the speaker, a sound of the music composition in accordance with the second remix signal, the sound of the music composition generated in accordance with the second remix signal at least partially differing from the sound of the music composition generated in accordance with the first remix signal.

6. An electronic musical instrument comprising:

at least one processor; and a speaker;

wherein the at least one processor is configured to:

output, to a terminal device that is communicably connected to the electronic musical instrument, a first instruction to remix one or more of a plurality of pieces of track data into a first remix signal in accordance with a first mixing pattern, the first mixing pattern specifying one or more of the plurality of pieces of track data to be included in the first remix signal, the first instruction being output from the electronic musical instrument in accordance with a first user operation, wherein the plurality of pieces of track data respectively correspond to a plurality of parts of a music composition, the plurality of pieces of track data being obtained by audio source separation processing performed on music composition data of the music composition to separate the music composition data into the plurality of pieces of track data, the music composition data being selected by a user and acquired by the terminal device from a memory, the music composition data being in a digital audio format, each of the plurality of parts of the music composition corresponding to a musical element of the music composition including at least one of a musical instrument part in the music composition and a vocal part in the music composition;

acquire the first remix signal which is output by the terminal device, wherein the terminal device creates the first remix signal by mixing the one or more of the plurality of pieces of track data specified by the first mix pattern;

generate and output, via the speaker, a sound of the music composition in accordance with the first remix signal;

output a second instruction to the terminal device in accordance with a second user operation, the second instruction instructing the terminal device to remix one or more of the plurality of pieces of track data into a second remix signal in accordance with a second mixing pattern different from the first mixing pattern, the second mixing pattern specifying one or more of the plurality of pieces of track data to be included in the second remix signal such that the second remix signal differs from the first remix signal;

acquire the second remix signal which is output by the terminal device, wherein the terminal device creates the second remix signal by mixing the one or more of the plurality of pieces of track data specified by the second mix pattern, and generate and output, via the speaker, a sound of the music composition in accordance with the second remix signal, the sound of the music composition generated in accordance with the second remix signal at least partially differing from the sound of the music composition generated in accordance with the first remix signal.

* * * * *